(12) United States Patent
Monson

(10) Patent No.: US 11,321,621 B2
(45) Date of Patent: May 3, 2022

(54) INFERENCING LEARNING AND UTILISATION SYSTEM AND METHOD

(71) Applicant: Ronald Christopher Monson, Subiaco (AU)

(72) Inventor: Ronald Christopher Monson, Subiaco (AU)

( * ) Notice: Subject to any disclaimer, the term of this patent is extended or adjusted under 35 U.S.C. 154(b) by 956 days.

(21) Appl. No.: 15/769,530

(22) PCT Filed: Oct. 20, 2016

(86) PCT No.: PCT/AU2016/095007
§ 371 (c)(1),
(2) Date: Apr. 19, 2018

(87) PCT Pub. No.: WO2017/066851
PCT Pub. Date: Apr. 27, 2017

(65) Prior Publication Data
US 2018/0314962 A1 Nov. 1, 2018

(30) Foreign Application Priority Data
Oct. 21, 2015 (AU) ................. 2015904318

(51) Int. Cl.
*G06N 20/00* (2019.01)
*G06N 5/04* (2006.01)
*G06F 17/18* (2006.01)
*G06N 7/00* (2006.01)
*G06F 40/40* (2020.01)

(52) U.S. Cl.
CPC ............. *G06N 5/041* (2013.01); *G06F 17/18* (2013.01); *G06N 7/005* (2013.01); *G06N 20/00* (2019.01); *G06F 40/40* (2020.01)

(58) Field of Classification Search
CPC ........ G06N 5/041; G06N 20/00; G06N 7/005; G06F 17/18; G06F 40/40
USPC .......................................................... 706/12
See application file for complete search history.

(56) References Cited

U.S. PATENT DOCUMENTS

| 9,292,658 | B2 | 3/2016 | Ashparie | |
| 2004/0103108 | A1* | 5/2004 | Andreev | ............... G06F 16/285 |
| 2009/0164416 | A1* | 6/2009 | Guha | ...................... G06F 16/31 |

(Continued)

OTHER PUBLICATIONS

Title: Statistical Analysis based Hypothesis Testing Method in Biological Knowledge Discovery Author: Md. Naseef-Ur-Rahman Chowdhury, Suvankar Paul, and Kazi Zakia Sultana Publisher: International Journal on Computational Sciences & Applications (IJCSA) Volume and Date: vol. 3, No. 6, Dec. 2013 (Year: 2013).*

(Continued)

*Primary Examiner* — David R Vincent
(74) *Attorney, Agent, or Firm* — Neifeld IP Law

(57) ABSTRACT

An automatic system and method for the performance of scientific inferencing including the determination of a null hypothesis significance testing on an interactive computer system, the method including the steps of: (a) providing for the input of an input description of a proposed hypothesis test, the input description including a number of relevant input parameters; (b) utilising the computational system for processing the input description into a null hypothesis significance test; (c) executing the null hypothesis significance test on the computational system; and (d) visually displaying the results of the execution.

20 Claims, 10 Drawing Sheets

(56) References Cited

U.S. PATENT DOCUMENTS

| | | | |
|---|---|---|---|
| 2010/0023319 A1* | 1/2010 | Bikel | G06F 40/295 |
| | | | 704/9 |
| 2011/0022381 A1* | 1/2011 | Gao | G06F 40/44 |
| | | | 704/7 |
| 2011/0231356 A1* | 9/2011 | Vaidyanathan | G06N 7/005 |
| | | | 706/52 |
| 2013/0144555 A1 | 6/2013 | Hathaway | |
| 2014/0142893 A1* | 5/2014 | Hathaway | G06F 3/0484 |
| | | | 702/179 |
| 2015/0142701 A1 | 5/2015 | Ashparie et al. | |
| 2016/0078188 A1 | 3/2016 | Ashparie et al. | |
| 2017/0061292 A1* | 3/2017 | Odaira | G06N 5/006 |

OTHER PUBLICATIONS

Chowdhury, M. N. et al., 'Statistical Analysis based Hypothesis Testing Method in Biological Knowledge Discovery', International Journal on Computational Sciences & Applications (IJCSA), Dec. 2013, vol. 3, No. 6, pp. 21-29.

Lecuyer, M. et ai., 'Sunlight: Fine-grained Targeting Detection at Scale with Statistical Confidence', Proceedings of the 22nd ACM SIGSAC Conference on Computer and Communications Security (CCS '15), Denver USA, Oct. 12, 2015, pp. 554-566.

Safari, L. et al., 'Restricted natural language based querying of clinical databases', Journal of Biomedical Informatics, Jul. 19, 2014, vol. 52, pp. 338-353.

International Search Report, PCT application PCT/AU2016/095007, dated Jan. 9, 2017.

International Preliminary Report on Patentability, PCT application PCT/AU2016/095007, dated Feb. 20, 2018.

GuiMei Liu et al, "Supporting Exploratory Hypothesis Testing and Analysis" 2015, ACM Transactions on Knowledge Discovery from Data (TKDD), Association for Computng Machinery Inc., vol. 9, No. 4.—Cited as D1 in Extended European Search Report dated Jun. 7, 2019.

GuiMei Liu et al, "Towards Exploratory Hypothesis testing and analysis", Data Engineering (ICDE), IEEE 27th International Conference on Data Engineering, Apr. 11, 2011—Cited as D1 in Extended European Search Report dated Jun. 7, 2019—Cited as D1 in Extended European Search Report dated Jun. 7, 2019.

EESR Extended European Search Report dated Jun. 7, 2019.

Chowdhury, M. N. et aI., 'Statistical Analysis based Hypothesis Testing Method in Biological Knowledge Discovery', International Journal on Computational Sciences & Applications (IJCSA), Dec. 2013, vol. 3, No. 6, pp. 21-29.

Safari, L. et aI., 'Restricted natural language based querying of clinical databases', Journal of Biomedical Informatics, Jul. 19, 2014, vol. 52, pp. 338-353.

* cited by examiner

INFERENCING LEARNING AND UTILISATION SYSTEM AND METHOD

FIELD OF THE INVENTION

The present invention relates to the field of learning systems and methodologies, and, in particular, discloses a system and method for learning and performing statistical inference.

BACKGROUND OF THE INVENTION

Any discussion of the background art throughout the specification should in no way be considered as an admission that such art is widely known or forms part of common general knowledge in the field.

Scientific inference is an important methodology that is learnt and utilised by both students and researchers in many fields.

The way scientific inference and prediction is learned and performed is currently sub-optimal for both pedagogical and technological reasons.

Hypothesis Testing, or in some domains, Null Hypothesis Significance Testing (NHST) has been the backbone for establishing cause and effect in the sciences for close to a hundred years and it has many uses. For example, in marketing to determine if a campaign significantly boosted sales; a farmer wanting to assess whether a certain fertilizer improves yield; a factory owner determining if a modified manufacturing process will improve productivity or a curriculum designer deciding whether a new instructional technique improves learning outcomes; or whether or not an ingested medicine produces its intended effect.

There is a constant need to ensure the integrity, education and optimal practice of NHST. Researchers however, have uncovered significant issues with the logic and application of NHST's methodology some of which is related to why it is often poorly taught in both schools and universities. As a starting point for example, it is currently unwieldy, convoluted and clunky to perform. This can and does produce real-world, detrimental consequences.

SUMMARY OF THE INVENTION

According to a first aspect of the invention, there is provided an automatic method for the performance of scientific inferencing on a computational system, comprising: receiving an input description of a hypothesis test, and data on which the hypothesis is being tested; inferring a mathematical formulation of the hypothesis test from the input description for conducting the hypothesis test using the computational system, wherein inferring of the mathematical formulation comprises automatically inferentially selecting an appropriate type of test;
executing the hypothesis test on the data using the corresponding inferred mathematical formulation and the input description with the computation system to produce a result; and
displaying the result of the hypothesis test.

In an embodiment of the invention, the method further comprises inferring the mathematical formulation from a corpus of hypothesis test cases. Preferably inferring the formulation from a corpus of hypothesis test cases comprises using machine leaning to create an automated mapping from the input description to the mathematical formulation. The machine leaning preferably includes pattern matching. The input description can be a natural expression, including in a free text format.

In an embodiment of the invention, inferring the mathematical formulation from the corpus of hypothesis test cases comprises inferring the type of hypothesis test for the mathematical formulation from input descriptions and executed hypothesis tests in the corpus of hypothesis test cases.

In an embodiment of the invention, inferring the type of test for the mathematical formulation comprises training a processor to inferentially select the appropriate type of hypothesis test using a model built from the corpus of hypothesis test cases.

In an embodiment of the invention, the input description and the inferred mathematical formulation of the hypothesis test are added to the corpus of hypothesis test cases. In an embodiment of the invention, the result of the hypothesis test is added to the corpus of hypothesis test cases.

In an embodiment of the invention, the display includes the inferred mathematical formulation for verification by the user. This is a review of the inferred mathematical formulation and allows for amendment of the automated mapping. In an embodiment of the invention, amendment of the displayed mapping amends coupled parameters.

In an embodiment of the invention, the inferential selection of the type of test is changed when a user input indicates that the displayed inferred mathematical formulation is incorrect. In an embodiment of the invention, the change of the inferential selection of the type of test is automatic. In an embodiment the changed inferential selection is displayed.

In an embodiment of the invention, the method further comprises receiving an input from the user to change the mathematical formulation by the user selecting an alternative mathematical formulation.

In an embodiment of the invention, the display includes at least one assumption of the hypothesis test inferred from the input description. In an embodiment of the invention, the method further comprises receiving an input from the user to change said at least one assumption of the hypothesis test. In an embodiment of the invention, the inferential selection of the type of test is changed when the input changes the at least one assumption. In an embodiment of the invention, the change of the inferential selection of the type of test is automatic. In an embodiment the changed inferential selection is displayed.

In an embodiment of the invention, the method further comprises re-execution of the hypothesis test after a change is made.

In an embodiment of the invention, the method further comprises adding the results of the changed mathematical formulation of the hypothesis test to the corpus of hypothesis test cases. In an embodiment of the invention, the method further comprises adding the results of the re-execution of the hypothesis test to the corpus of hypothesis test cases.

In an embodiment of the invention, the method further comprises receiving an input from the user to change a parameter of the mathematical formulation. In an embodiment of the invention, the parameters include one or more of 1) Test Statistic, 2) Degrees of Freedom (where applicable) 3) Test Direction 4) Significance value and 5) Observed Statistic. For pedagogical use, an embodiment of the invention includes a p-value parameter.

In an embodiment of the invention, the hypothesis test is a null hypothesis test.

In an embodiment of the invention, the display includes the display of a plurality of individual parameters of the input description. In an embodiment, the parameters include at least one of alpha, $t_{obs}$, $t_{alpha}$ and the p-value for the null hypothesis test. In an embodiment of the invention, the display includes the user description of the test.

In an embodiment of the invention, the computational system retrieves a set of information from an external source relevant to the null hypothesis test.

In an embodiment of the invention, the set of information from the external source supports the inference of the mathematical formulation.

In an embodiment of the invention, automatically inferentially selecting the appropriate type of test comprises using a machine learning technique to take the input description from the user to determine the appropriate type of test, based on learnt previous tests used for previous hypothesis tests.

In an embodiment of the invention, the display comprises an indication of whether the hypothesis being tested is accepted or rejected.

In one embodiment of the invention, an inference model is trained on a training set consisting of a corpus of natural language descriptions (that encompass assumptions, hypothesis parameters and experimental data) with each description paired with the Hypothesis Test that is "appropriate" for testing statistical significance. With sufficient training (from corpuses curated but also from user-input to the invention) the model so formed is then able to infer the appropriate test when provided with an unseen (natural language) description of a new testing scenario.

According to a second aspect of the invention, there is provided a method for inferring a mathematical formulation of a hypothesis test on a computational system, comprising:
determining a corresponding mathematical formulation from an input description from a user;
determining a set of corresponding assumptions for application to the corresponding mathematical formulation from the input description from the user; and
displaying the corresponding mathematical formulation and the set of corresponding assumptions for verification by the user.

According to a third aspect of the invention, there is provided an automatic method for training a computational system to perform hypothesis tested based on a received description of the hypothesis test, comprising:
providing a corpus of hypothesis test cases;
processing an input description so as to infer a mathematical formulation of the hypothesis test from the input description, wherein inferring of the mathematical formulation comprises automatically inferentially selecting an appropriate type of test based on the type of test used for similar hypothesis tests;
storing the inferred mathematical formulation in the corpus of hypothesis test cases.

In an embodiment of the invention, the method further comprises checking the inferred mathematical formulation and changing it if necessary, wherein the stored inferred mathematical formulation comprises any changes to the mathematical formulation. In an embodiment the assumptions of the test used are checked and parameters used in the test are checked.

According to a fourth aspect of the invention, there is provided a system for performing scientific inferencing, comprising:
a receiver for receiving an input description from a user of a hypothesis test, and data on which the hypothesis is being tested;
a processor for inferring a mathematical formulation of the hypothesis test from the input description for conducting the hypothesis test on the data using the computational system, wherein the inferring of the mathematical formulation comprises automatically inferentially selecting an appropriate type of test;
a processor for executing the hypothesis test using the corresponding mathematical formulation and the input description with the computation system; and
an output to a display for displaying the results of the hypothesis test.

According to a fifth aspect of the invention, there is provided a computer program for instruction a computer to perform scientific inferencing, comprising instructions for controlling a processor to:
receive an input description from a user of a hypothesis test, and data on which the hypothesis is being tested;
infer a mathematical formulation of the hypothesis test from the input description for conducting the hypothesis test using the computational system, wherein the inferring of the mathematical formulation comprises automatically inferentially selecting an appropriate type of test;
execute the hypothesis test on the data using the corresponding mathematical formulation and the input description with the computation system; and
display the results of the hypothesis test.

According to a sixth aspect of the invention, there is provided a system for inferring a mathematical formulation of a hypothesis test, comprising:
a processor for determining a corresponding mathematical formulation from an input description from a user;
a processor for determining a set of corresponding assumptions for application to the corresponding mathematical formulation from the input description from the user; and
an output displaying the corresponding mathematical formulation and the set of corresponding assumptions for verification by the user.

According to a seventh aspect of the invention, there is provided a computer program for instruction a computer to perform scientific inferencing, comprising instructions for controlling a processor to:
determine a corresponding mathematical formulation from an input description from a user;
determine a set of corresponding assumptions for application to the corresponding mathematical formulation from the input description from the user; and
display the corresponding mathematical formulation and the set of corresponding assumptions for verification by the user.

According to an eighth aspect of the invention, there is provided a computational system for performing hypothesis tested based on a received description of the hypothesis test in relation to data potentially indicative of the hypothesis being tested, comprising:
a storage of a corpus of hypothesis test cases;
a receiver of an input description;
a processor configured to infer a mathematical formulation of the hypothesis test from the input description, wherein inferring of the mathematical formulation comprises automatically inferentially selecting an appropriate type of test based on the type of test used for similar hypothesis tests; wherein the inferred mathematical formulation is the stored in the corpus of hypothesis test cases.

According to a ninth aspect of the invention, there is provided a computer program for controlling a computer to performing hypothesis tested based on a received description of the hypothesis test in relation to data potentially indicative of the hypothesis being tested, comprising instructions for controlling a processor to:
store of a corpus of hypothesis test cases;
receive of an input description;
infer a mathematical formulation of the hypothesis test from the input description, wherein inferring of the mathematical formulation comprises automatically inferentially selecting an appropriate type of test based on the type of test used for similar hypothesis tests;
wherein the inferred mathematical formulation is the stored in the corpus of hypothesis test cases.

According to a tenth aspect of the invention, there is provided an automatic method for the performance of scientific inference including the determination of a null hypothesis significance test, the method comprising: a) inputting a description of the proposed hypothesis test, the input description comprising a number of input parameters; b) using a computational system for processing the input description into a null hypothesis significance test; c) executing the null hypothesis significance test on the computational system; d) displaying the results of the execution; e) receiving an input to change a parameter of the executed null hypothesis test; f) automatically re-executing the null hypothesis significance test on the computational system using the changed parameter; and g) displaying the results of the re-execution.

In an embodiment, the re-execution is displayed along with the display of the results of the execution.

In an embodiment, the processed null hypothesis significance test includes a parameter determined from the input description, and the determined parameter is displayed. In an embodiment, the changes parameter is displayed.

In an embodiment, the change to a parameter is dynamically linked to the display of the results of the re-execution.

According to an eleven aspect of the invention, there is provided an automatic method for the performance of scientific inference including the determination of a null hypothesis significance test using a computational system for inputting a description of the hypothesis, the input description comprising a number of input parameters dynamically and pedagogically coupled to the result of the test displayed by the system.

According to a twelfth aspect of the invention, there is provided an automatic method for the understanding of scientific inference including the dynamic coupling of input parameters according to the logic, unity and workflow of null hypothesis significance testing.

According to an thirteenth of the invention, there is provided a computational system for performing hypothesis tested based on a received description of the hypothesis test in relation to data potentially indicative of the hypothesis being tested, comprising:
a) an input for inputting a description of the proposed hypothesis test, the input description comprising a number of input parameters;
b) a first processor element for processing the input description into a null hypothesis significance test;
c) a second processor element for executing the null hypothesis significance test on the computational system;
d) a display for displaying the results of the execution;
e) an input for receiving a change a parameter of the executed null hypothesis test;
f) wherein the second processor element is configured to automatically re-execute the null hypothesis significance test on the computational system using the changed parameter; and g) the display is configured to display the results of the re-execution.

According to a fourteenth aspect of the invention, there is provided a computer program for controlling a computer to performing hypothesis tested based on a received description of the hypothesis test in relation to data potentially indicative of the hypothesis being tested, comprising instructions for controlling a processor to:
a) input a description of the proposed hypothesis test, the input description comprising a number of input parameters; b) use a computational system for processing the input description into a null hypothesis significance test; c) execute the null hypothesis significance test on the computational system; d) display the results of the execution; e) receive an input to change a parameter of the executed null hypothesis test; f) automatically re-execute the null hypothesis significance test on the computational system using the changed parameter; and g) display the results of the re-execution.

BRIEF DESCRIPTION OF THE DRAWINGS

Embodiments of the invention will now be described, by way of example only, with reference to the accompanying drawings in which.

REFERENCES

Figure 1:
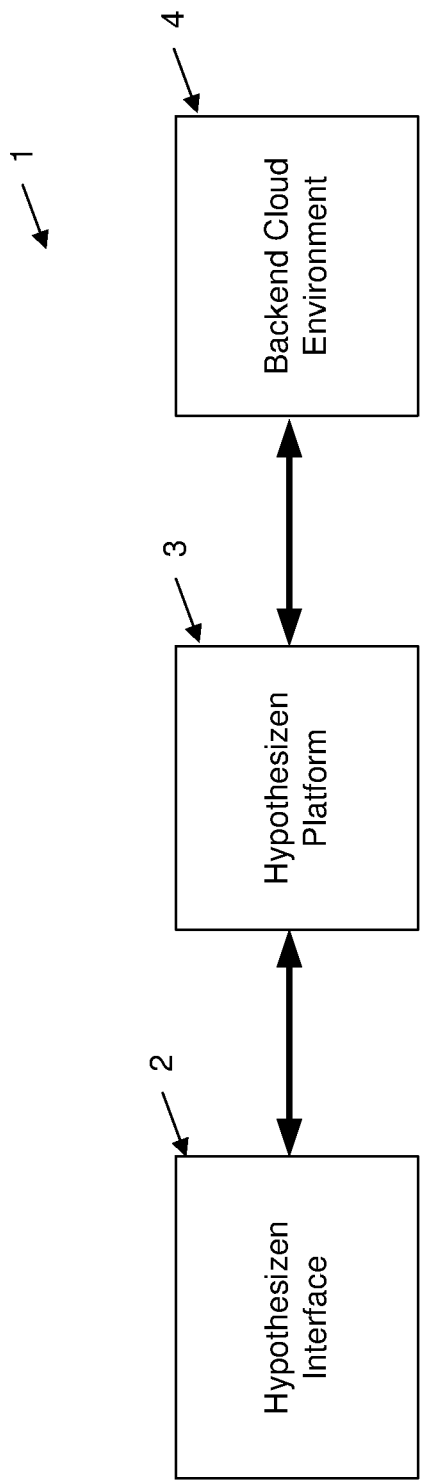
FIG. 1 illustrates the operational environment of the first embodiment.

[Crichton(2014)] D. Crichton, From crowdfunding to open access, startups are experimenting with academic research—TechCrunch, 2014.

[Monson(2014a)] R. Monson, How does location test choose its "automatic test"?, in: Mathematica Stack Exchange.

[Monson(2014b)] R. Monson, Given two samples, how does location test select its automatictest?, in: Mathematica Stack Exchange.

[Freedman(2010)] D. Freedman, Lies, damned lies, and medical science—the Atlantic, The Atlantic (2010).

[Editorial(2013)] Editorial, Unreliable research: Trouble at the lab—The Economist, 2013.

[Lew(2013)] M. Lew, Give p a chance: significance testing is misunderstood, The Conversation (2013).

[Cumming(2013)] G. Cumming, The problem with p values: how significant are they, really?, The Conversation (2013).

[Nuzzo(2014)] R. Nuzzo, Scientific method: statistical errors, Nature 506 (2014) 150-2.
[Freedman(2008)] L. S. Freedman, An analysis of the controversy over classical one-sided tests, Clinical trials (London, England) 5 (2008) 635-640.
[Monson(2014)] R. Monson, Is learning to use Mathematica useful for pure theoretical research in mathematics and computer science?, in: Mathematica Stack Exchange.
[DYER(1877)] W. T. T. DYER, The effects of cross- and self-fertilisation in the vegetable kingdom, Nature 15 (1877) 329-332.
[Rehmeyer(2011)] J. Rehmeyer, Darwin: The reluctant mathematician, The Best Writing on Mathematics 2010 (2011) 377.
[Jacquez and Jacquez(2002)] J. A. Jacquez, G. M. Jacquez, Fisher's randomization test and darwin's data—a footnote to the history of statistics, 2002.
[Fisher(1949)] S. R. A. Fisher, The Design of Experiments, Oliver and Boyd, 1949.

DETAILED DESCRIPTION

First embodiment provides for an improved system for learning and applying statistical inference including NHST.

Machine-Human Interaction: The first embodiment applies user's natural language description of their problem to help insert parameter values for the statistical/computation analyses of this data.

Design Unity: The first embodiment brings scientific inference into a single interface.

Pervasive Pedagogy: The first embodiment fuses the learning of hypothesis testing with its practice. This flows naturally when the interface's design expresses the methodology's underlying logic.

The synergistic effect of all of the above leads to a step jump in the usability of applying statistical inference. This leads initially to more efficient and correct hypothesis testing and in the long-term more natural transitions to other systems of scientific inference.

The first embodiment can be constructed, in a rapid prototype form, in the Wolfram Language as a cloud-based environment. While the cloud functionality provides all the standard advantages—seamless accessibility, automatic version upgrades and back-ups—more significant in this context is that the very act of users interacting with its interface causes incremental improvement.

As users describe in natural language their hypothesis and specify the corresponding mathematical formulation, the first embodiment learns about this fundamental correspondence. Consequently as user inputs collectively and incrementally insert their formed hypotheses, the embodiment incrementally improves in its ability to predict and suggest a correct, corresponding mathematical formulation. Over time, an "artificial intelligence" paradigm shift emerges on the corpus of millions of users.

An individual user may disagree with the embodiment's suggestion, but by correcting it with their human intelligence (as they may need to do more frequently initially—but in a way still more user-friendly than with current state-of-the-art systems), the first embodiment's suggestions progressively become more accurate—a machine-human interplay ensues.

The Embodiment (Logic)

Turning initially to FIG. 1, the embodiment, hereinafter designated as Hypothesizen, is designed to operate over a cloud based internet platform and includes an external visual input interface 2, which interacts with platform code 3 which runs on a backend cloud environment 4, such as those provided by third parties.

Figure 2:
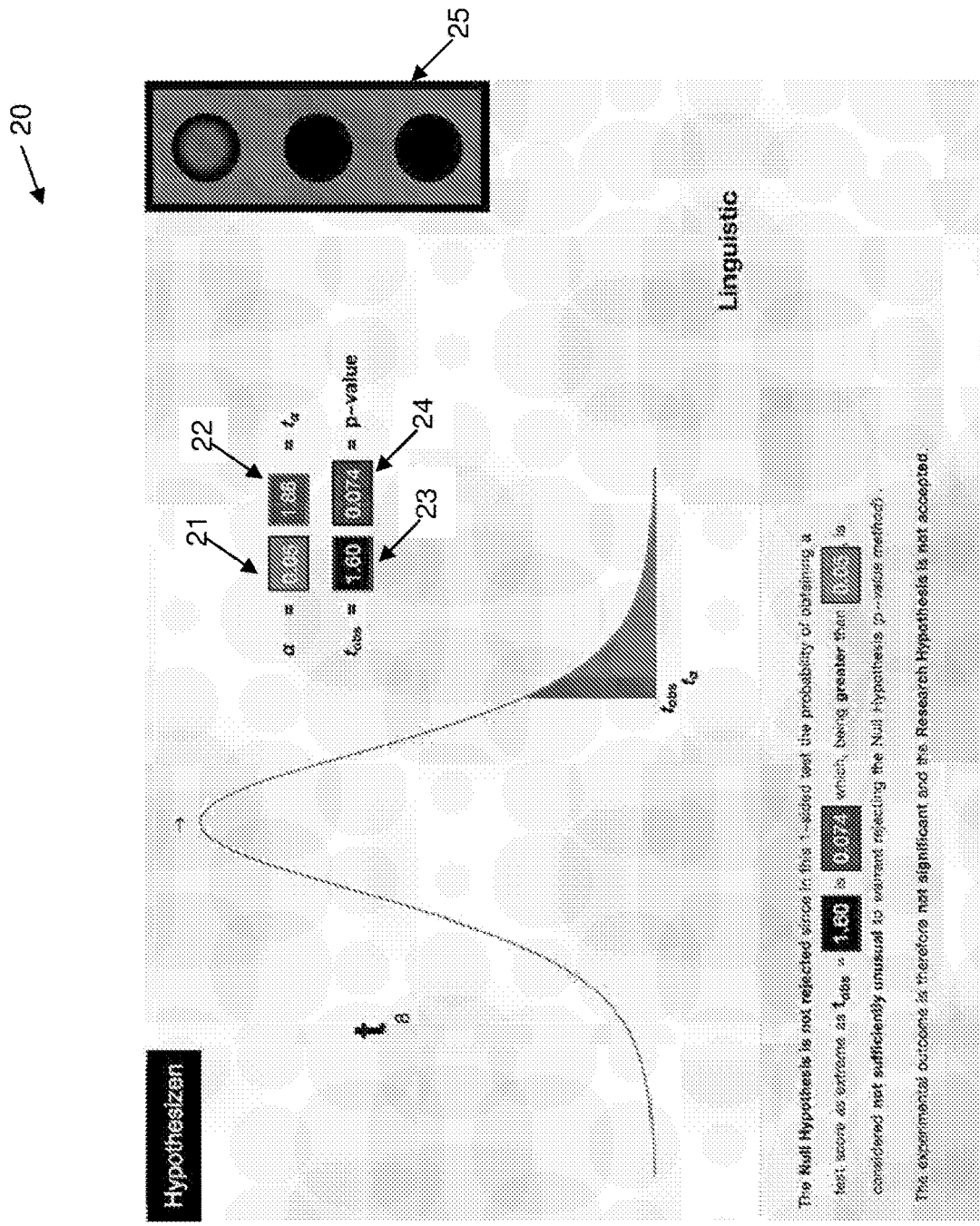
FIG. 2 illustrates of user interface logic of the logic used in the NHST test.

Turning now to FIG. 2, there is illustrated a first user interface 20 of the embodiment, which illustrates the user interface 20 for the logic that is applied to determine the outcome of a test in statistical inferencing and is ultimately earmarked for inclusion as a component in embodiment's main interface. The interface 20 includes a series of data entry boxes 21-24 for the entry of relevant data values. These data values can get populated if the Hypothesizen (Logic) is used in isolation. In an alternative embodiment, these are populated automatically from either a linguistic description and/or user refinement in the user interface. The automatic population includes the re-execution of the hypothesis test using the new data obtained from the user refinement in the user interface.

The entry of data values result in logic which is applied in statistical inference to conclude that this experiment is significant or not by signalling the presence of a causative (non-random) mechanism by either: (1) A green traffic light in panel 25, (2) a p-value (p-value=probability value) of 0.024 being less than $\alpha$=0.1 ($\alpha$=significance level) or (3) $t_{obs}$ ($t_{obs}$=observed score) being within the critical region as defined by $t_{\alpha/2}$ ($t_\alpha$=test statistic of $\alpha$).

The Hypothesizen-logic, is an example of the parametric-coupling that is to pedagogically pervade the workflow.

Traditional NHST Workflow

Figure 3:
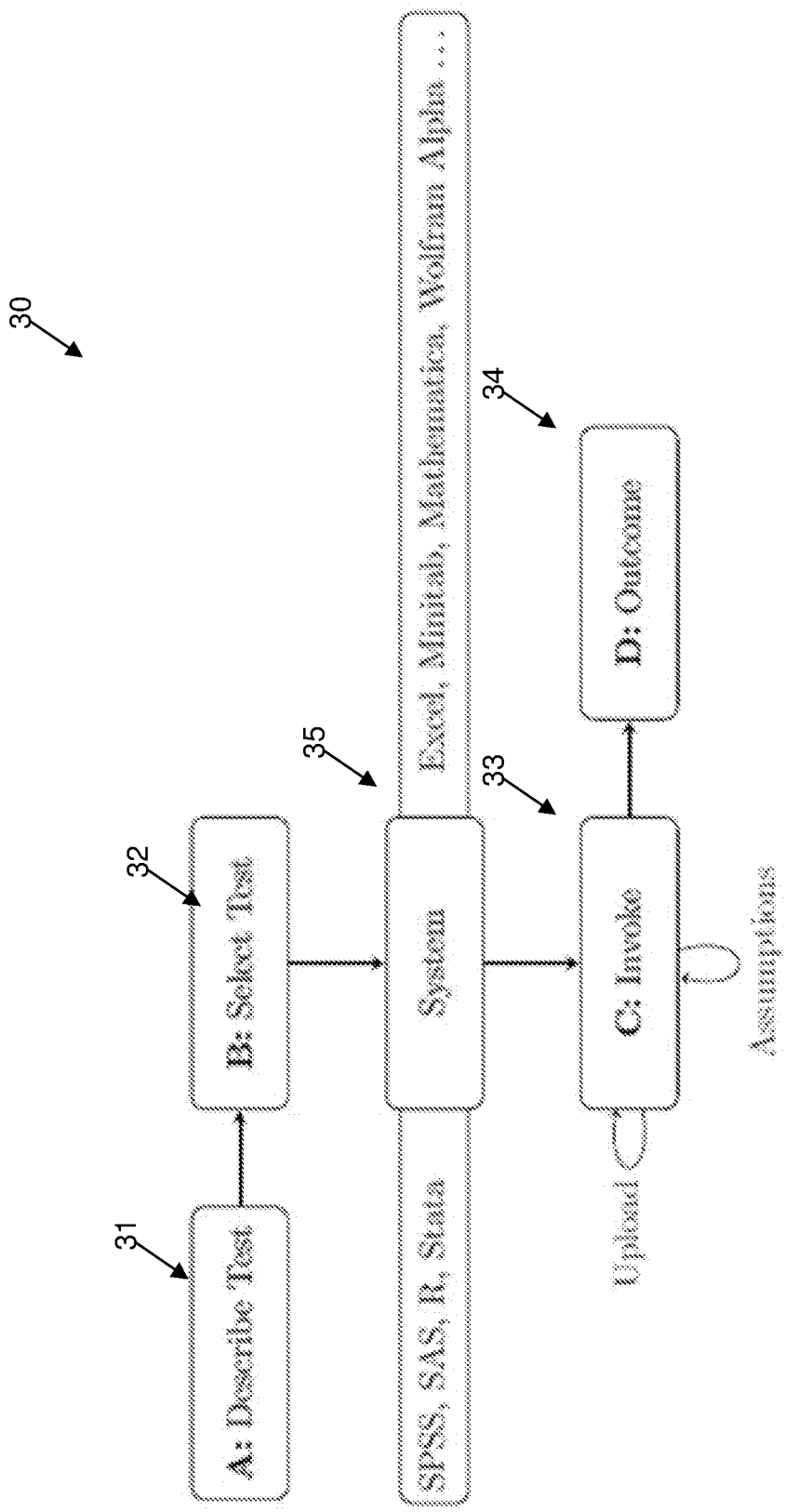
FIG. 3 illustrates a 4 stage NHST workflow as currently practiced.

The traditional flowchart of the steps used to perform statistical inference is illustrated in FIG. 3 and can be viewed as consisting of four main steps, A, B, C, D. The first step, A 31, describes the test's aim, experimental design, set-up and data. The second step, B 32, selects the appropriate test according to the specified experimental design. The third step, C 33, invokes the selected test using the tester's first software. Finally, the fourth step, D 34, displays the test's verdict in formatted output.

Modern Hypothesis Testing is sub-optimal because performing Steps B and C is unnecessarily convoluted. This leads to frequent misapplication and misconception of the method. The embodiments provide an automated visual interface. The embodiments also seek to reduce, if not entirely eliminate steps B and C, as they become progressively automated through mass specifications.

The first two steps, A and B occur before and therefore outside the chosen system which then performs the computations needed in Steps C and D (some major systems are shown in the gray box).

Figure 4:
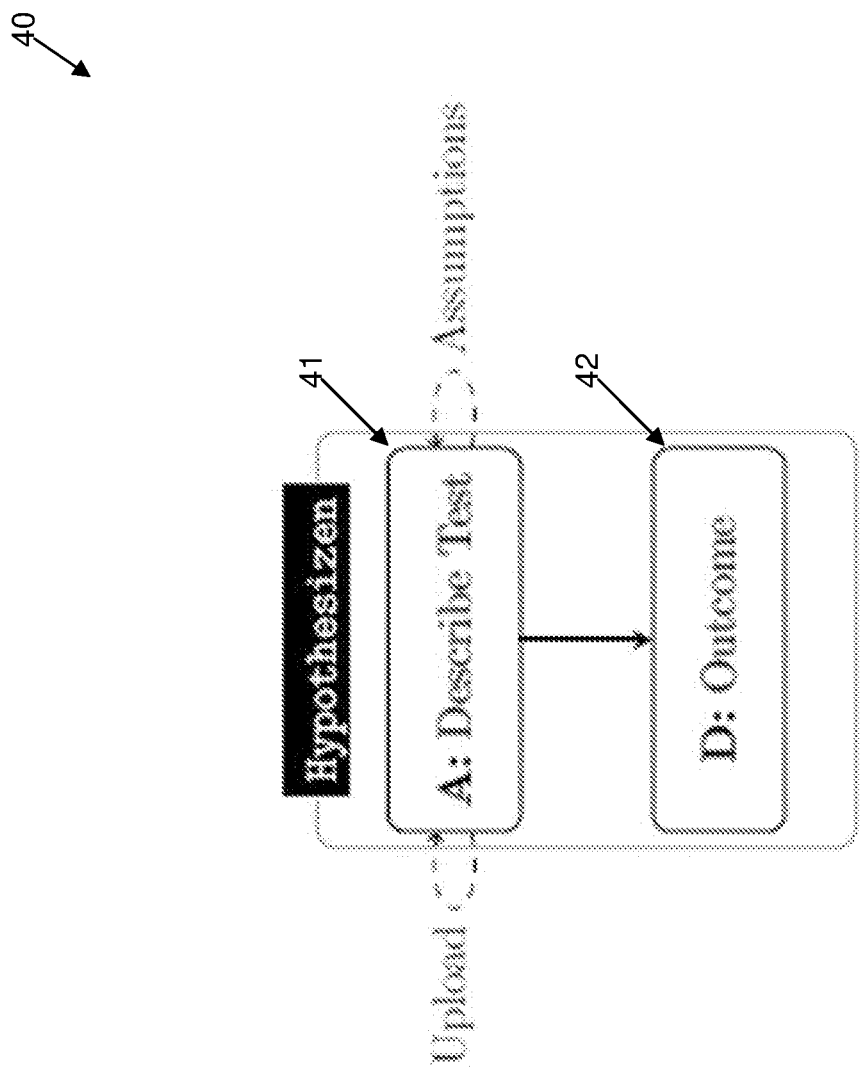
FIG. 4 illustrates a 2 stage NHST workflow of the embodiment.

Consequently, Referring to FIG. 4, NHST begins to resemble more a 2-step, A, D process 40. Users explain the test's set up and observed data (A, 41) before instantly receiving the test's outcome (D, 42). The workflow of the first embodiment. NHST's workflow therefore eventually becomes simplified into a 2-step, A-D process A, D thereby eliminating the significant friction associated with steps B and C.

Next, each of the steps 31-35 of FIG. 3 will now be described in more detail.

Step a 31: Experiment's Description

In this step, the design and background of an experiment is described. Assumptions and methods are stated and clarified. This typically corresponds to the Method section of a report or journal article and can also take the form of a paragraph-long exercise description within a statistical textbook. The important data and parameters of the statistical test can often be described in a single paragraph and one of the core principles of Hypothesizen is that these descriptions can be usefully mined to either partially or fully populate the parameters of a function call ultimately evaluating the statistical test.

For example, consider the real-life experiment conducted by Charles Darwin over a century ago as he attempted to detect hybrid vigour: The experimental aim was to demonstrate hybrid vigor amongst a species of plant—snapdragons. Two groups, GI and G2 of 15 grafts were grown in similar conditions (adjacent pots with similar soil quality, sunlight water etc) with the only apparent difference being that plants from sample A were asexually fertilized whilst plants from sample S were sexually fertilized. The heights of plants from both samples was then recorded as follows: S (sexual): {23.5, 12, 21, 22, 19.125, 21.5, 22.125, 20.375, 18.25, 21.625, 23.25, 21, 22.125, 23, 12}, A (assexual): {17.375, 20.375, 20, 20, 18.375, 18.625, 18.625, 15.25, 16.5, 18, 16.25, 18, 12.75, 15.5, 18}. In modern parlance, the question posed was then: Can it be concluded (at the 5% significance level) that sexually fertilized snapdragons grow significantly taller than their asexually fertilized counterparts thereby supporting the phenomenon of Hybrid Vigour?

Traditionally, this step has been separated in statistical software whereas Hypothesizen seeks to directly incorporate it as part of NHST's workflow.

Darwin's experimental set-up as paraphrased above contains all the essential elements for specifying and invoking the "correct" statistical test in the experimenter's first software system. For example: the apparent experimental design of a Paired t-test can be deduced from the phrase 'similarly grafted and similar conditions' (and perhaps equal sample sizes and the lack of the use of the word "independent"); its one 1-tailed nature is hinted at through "grow significantly taller" while $\alpha=0.05$ settings clearly comes from the "5% significance level" term.

The first embodiment seeks to advantageously automate these deductions thereby introducing, for the first time, machine assistance into interpretations of experimental designs. Additionally, an interactive visual interface is provided for user confirmation thereof.

Step B 32: Selecting a Statistical Test

The justification and reasoning behind selecting a statistical test has mathematical underpinnings that form part of standard statistical education. In practice however, for most NHST users, this theory manifests in a series of memorized rules for determining a test's applicability. These rules are typically communicated in decision trees whose inculcation is a prerequisite for carrying out Step B. The decision tree might, for example, contain a path down to a Paired-Samples t-test node to indicate that this is the relevant test to apply in Darwin's snapdragon experiment. The nodes that define a route to this decision reflect elements of Darwin's experimental design and frequently appear in such trees as follows: 1) a node specifying that the variables of interest are an Interval form of Data; 2) a node specifying the testing of one-sided differences; 3) a node specifying Two Groups; 4) a node specifying the samples independence.

There are however, three main problems with this decision-tree approach towards determining an appropriate NHST test:

1. Decision trees encompassing all assumptions for all tests quickly overwhelm the human perceptual/memory system.

2. The process of memorizing/consulting/traversing a decision tree is a mechanical process contributing little to understanding NHST's logic.

3. It is methodologically dubious whether a fixed algorithm embodied in single decision tree represents sound NHST practice.

The core of each of these three problems is ultimately methodological, and collectively work against realizing NHST's originating logic. For example, there are several other assumptions that need satisfying in order to justify the selection of a Paired-samples t-test (according to the underlying statistical theory). For example, one such assumption stemming from the underlying theory is that both samples are drawn from Normal populations and hence the likelihood of this eventuality needs checking at some point prior to applying a Paired-samples t-test. Further, some decision trees include normality tests as an explicit node while others don't, reflecting the reality that what is obvious for some needs spelling out for others. Accordingly the "right" tree depends on a user's background and experience. Furthermore, irrespective of ability and experience, the full range of tests and corresponding assumptions is simply too large for a human to readily memorize and therefore efficiently apply.

The process of navigating a decision tree by matching its nodes to experimental conditions and assumptions is a consequence of NHST's underlying statistical theory and is not a pre-requisite for applying or understanding its logic. It therefore constitutes a pattern-matching exercise that can consequently be underpinned by computational assistance. What this means is that an explicit understanding and operation of any of these decision trees is therefore not necessary in the presence of well-designed computational assistance.

The first embodiment does away with having to commit such flowcharts to memory since the decision about what test to apply is instead extracted from experimenters' initial descriptions (via machine learning algorithms backed up with additional user-interaction if necessary).

At a more abstract, logical level, what has previously occurred is the use of these decision trees to facilitate a pattern matching exercise in which the conditions (antecedent) of a theorem (consequent) have been matched to an experiment currently under consideration.

It has previously been axiomatic that users explicitly check Normality prior to applying a Paired-samples t-test but this is to mistakenly accept the permanency of current NHST workflows as has been implicitly conceded within contemporary software design. The position that NHST practitioners need to, for example, inculcate that normality checking precedes a Paired samples t-test is reasonable only if it was such a test was one of a small number of different NHST tests or if it was assumed that such a determination cannot be extracted from an experiment's natural language description (bearing in mind that the software ultimately needs instruction on what test to apply). In actuality however, both conditions do not hold. Firstly, NHST includes not just a few tests but dozens whose memorization includes a multitude of accompanying assumptions. Secondly, as demonstrated in prototypes of the first embodiment, NHST software can be designed to encompass the problem description from which, for example, the potential usefulness of a Paired samples t-test can be automatically inferred.

By designing NHST software to encompass problem descriptions, computational assistance can readily be brought to bear on checking tests' assumptions and therefore on their appropriateness. Consequently, users no longer need to remember sequences of implications or convoluted decision trees but instead, can focus more on checking relevant assumptions when flagged to do so by machine assistance. In particular, those assumptions requiring human insight receive prioritized attention (including normality assumptions). This permits a more balanced human/machine dynamic whereby automation is introduced for setting "perfunctory parameters" (e.g. significance levels and sample size) while working with human judgment where this faculty is indispensable (say in some normality and independence determinations).

Figure 5:
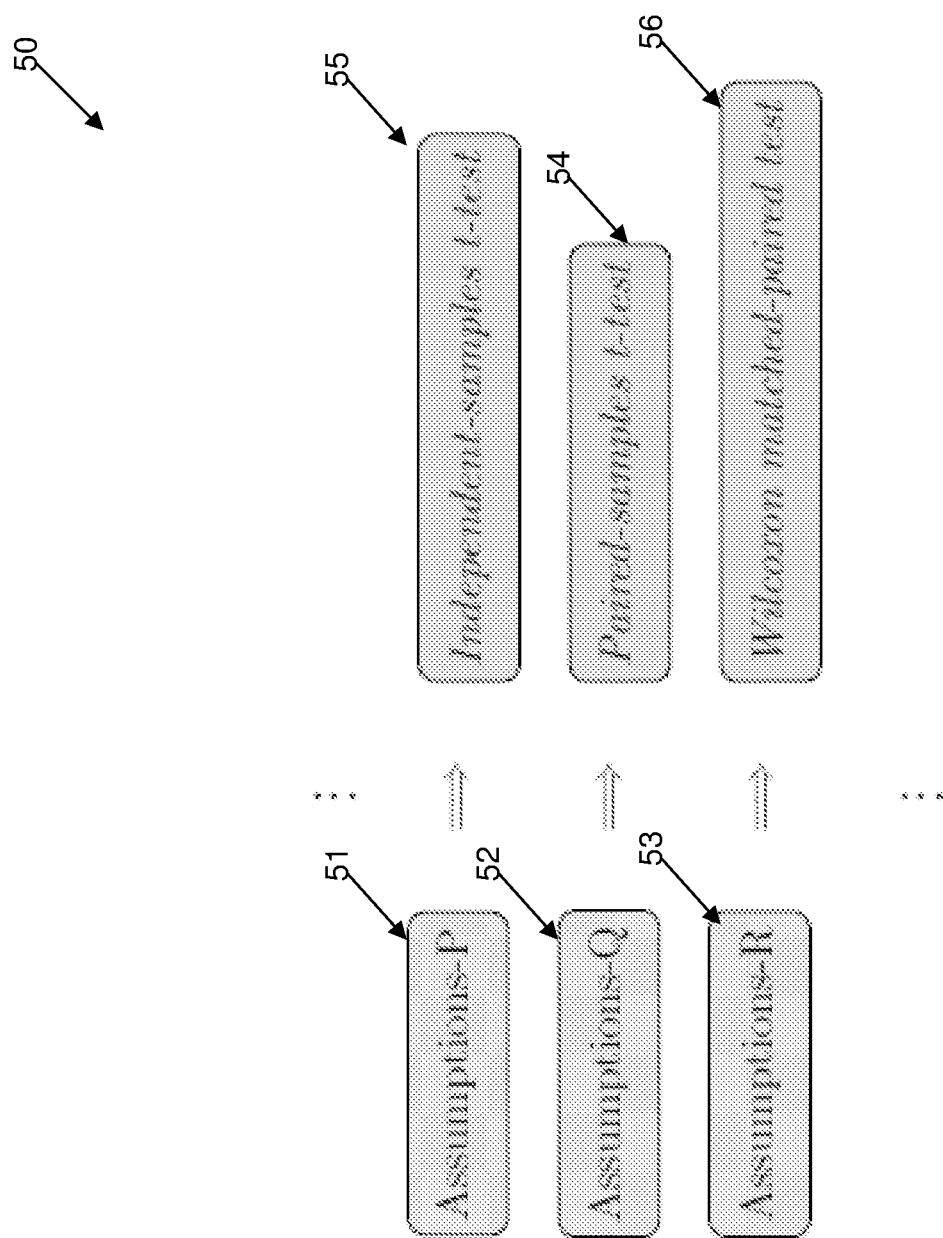
FIG. 5 illustrates the process of selecting an appropriate NHST test based on a set of initial assumptions as is currently practiced.

With reference to FIG. 5, selecting or designing the appropriate NHST test amounts to ensuring the assumptions of an experimental design are being met. Darwin's experimental design just described, for example, matches the assumptions of Assumptions-Q 52 and hence the Paired-samples t-test 54 becomes appropriate. If however, this design considered Sample S and Sample A as being independent, assumptions-P 51 would then be satisfied leading to the choice of an Independent-samples t-test 55; alternatively, if the samples were considered to not come from Normal populations then Assumptions-R 53 becomes satisfied with the (non-parametric) Wilcoxon matched-paired test becoming the appropriate test choice. The similarity of these assumption sets (each leading to a different, corresponding test) has led to their juxtaposed consideration, not just in textbooks, but also as adjacent nodes in decision trees designed to capture all such correspondences. This tree representation therefore, is purely a device for assisting the human memory system and one destined to become increasingly inadequate given that 1) the list of rules go well beyond the three shown here (instead numbering in the dozens); 2) different users have different perceptions of what assumptions need checking and 3) tests' assumption sets don't always have levels of similarity that lend themselves to neat distinctions within a single, tree-like structure.

An embodiment's approach is to instead utilise machine (learning) assistance acting on natural language descriptions of the experiment as part of automatically deciding what assumptions are satisfied (with prompting if human assistance is additionally required) and hence automatically determine the most appropriate test (and in so doing eliminate Step B 32 of FIG. 3).

An over-reliance on decision trees directs users towards a single test instead of profitably considering multiple tests that collectively incorporate the inevitable uncertainty surrounding underlying assumptions. The rigidity of a tree-based NHST decision fixes a number of assumptions (at each of its nodes) whereas it is not always black or white whether a particular assumption holds and/or these may change as subsequent information comes to light. Further, the robustness of tests varies in terms of their sensitivities to underlying assumptions all of which suggests the methodological soundness of developing a more sophisticated, holistic process for selecting a NHST test.

An even more serious methodological flaw arises from the rigid adoption of decision trees as the means for selecting a NHST test, namely an altering of the logical basis that underpins the entire paradigm. When tree's nodes specifying test assumptions are themselves decided by statistical tests the meaning of NHST's significance level is subtly shifted. Consider, for example, a node deciding a "sample's normality" through applying a Koglomorov-Smirnof test of normality (a practice unfortunately followed by most well-known statistical systems). Such practice however, subtly shifts the meaning of the significance level, a, since samples no longer occupy critical regions a % of the time. This corruption lies behinds statisticians' recommendations that samples instead be "eyeballed" as part of evaluating normality (see [Monson(2014a)] and [Monson(2014b)] for a more detailed discussion in the Mathematica context) and also reinforces the importance of establishing a finely balanced human/machine dynamic in any system of scientific inference.

Step C: Invoking Tests in Statistical Systems

Having selected the correct statistical test—effectively identifying the chosen experimental design—the next step in NHST's workflow involves computing the test statistic and determining the resulting p-value (C, 33). Prior to the computer revolution (and still practiced in some contemporary statistical courses), determining this p-value has been done by consulting tables but today can be much more easily performed by computer. The process of using a computer however, remains far from optimal since it involves two steps into which frustration and error frequently occur. Firstly, within the user's favorite statistical software system, the user needs to locate the test in menu-based systems or else construct the test in the system's command-based language.

In order to apply a menu-based test within a statistical system, a user has to first find it—a non-trivial search task when the test is situated amongst dozens of possible alternatives. The situation deteriorates further however, when these alternatives are themselves situated amongst hundreds or even thousands of menu items that is the case for modern statistical systems designed to include a much broader functionality. While it is true that following an initial learning curve, greater familiarity reduces this search time, it is nonetheless a search time with a lower bound and therefore with a fixed cost. It is also a search time that constitutes a major barrier to both new learners and non-frequent practitioners and finally, it represents a search time that can but increase as statistical functionality continues to expand within these comprehensive systems. The usability barrier contained in these learning curves is even more pronounced when it comes to command-line invocations—ultimately the same search but in a different guise. Instead of remembering a menu's location, users now need to remember the name and syntax of a particular command—effectively learning an entirely new language.

Having found the right menu location or recalled the right command-line syntax, the parameters from the experiment then need to be translated, transcribed and/or inserted by the user into the appropriate menu fields or command-line arguments. This again represents a non-trivial task that while readily automated for some parameters (by processing sample data—e.g. sample size); for others manual insertions are typically required from the user (e.g. significance levels, normality, independence etc).

The invocational step embodied in Step C 33 of FIG. 3 constitutes therefore, a major impediment to seamless, intuitive hypothesis testing.

The first embodiment preferably bypasses this step. The capacity to apply machine learning on large corpuses of experimental descriptions allows the automation of not only the test's correct selection (Step B) but also its correct invocation (Step C) and in so doing removes a major cognitive burden faced by all users applying this scientific methodology.

Step D: Displaying a Test's Outcome

The final Step D 34 in NHST's workflow involves interpreting, archiving and applying the final test's announced outcome. Unifying and improving the form of this output advances current practice and while not ostensibly to the same transformative, efficiency-improving degree as that more transparently indicated through eliminating Steps B and C, its essentialness stems from how it completes NHST's workflow.

In NHST's workflow, the prospect of eliminating Steps B and C using machine learning algorithms depends on machines gaining access to a sufficiently large corpus of experimental descriptions (such as those gathered in Step A), a prospect that, in turn, feasibly arises only when enough researchers and students become sufficiently incentivised to contribute. The point of housing the complete NHST, A, B, C, D, workflow 31-34 in a cloud-based environment is that offering a potentially indispensable service to both researchers and students precisely constitutes such an incentive.

For students eager to complete an assignment question, but being stymied by the syntax or menu operation of their institution's choice of statistical software, the first embodiment's Step D provides an immediate salve. By describing the question to Hypothesizen, students not only immediately receive the question's answer, but also the relevant software's syntax/menu commands for producing that answer. Hence students, through the necessity of passing their course receive first-hand experience of their software's redundancy in comparison to the first embodiment workflow.

There are also compelling pedagogical benefits to be had from accessing Hypothesizen beyond that of completing assignments and navigating legacy software. Students can, for example, gain greater insight into the logic of NHST's paradigm by utilizing freed-up time (created from removing mechanical steps) to interact with Hypothesizen's pedagogical constructs.

The Hypothesizen's portal can also offers a way of managing and organizing all the statistical tests conducted by students during their studies. This represents an advantage for exam preparation and the compilation of a (statistical) "portfolio"—increasingly a mandatory component in modern curricula.

Finally, students represent the next generation of NHST testers so the flow-on effects of introducing Hypothesizen's workflow are long-standing. It directly addresses the well-documented methodological inertia and cycle of "teachers teaching what they were taught"; a cycle subverted to the degree to which Hypothesizen helps students meet their next assignment deadline.

For researchers, Step D represents the final step that facilitates the addition of their statistical analysis into the academic literature as part of establishing an online presence for their: research conclusions; peer review; referencing; data storage; future replication; related analyses and as a permanent record of their analysis and achievement. These all provide powerful incentives for researchers to organize their statistical tests within Hypothesizen's portal.

Hence even without considering its role in progressively eliminating steps B and C, setting up a portal containing all four steps A to D represents a significant development in its own right.

The last Step D, completing NHST's workflow contains several advantages. Firstly, being able to check outputs on multiple systems (for example, computations in R and Mathematica and the syntax of all other systems) adds a layer of certainty and credibility to researchers' analyses. Secondly, the form of NHST test output can be improved and standardized while also dynamically linking to other test parameters. Thirdly, as the number of cloud users grows, tests can be automatically linked to related research designs and academic articles as part of unearthing new linkages. Finally, being able to efficiently perform a statistical test creates opportunities for applying other methodologies to the collected data.

NHST Workflows by System

Illustrations of the NHST workflow of FIG. 3 as exemplified by leading, statistical systems will now be illustrated with reference to Darwin's (Paired-samples t-test) test of hybrid vigour. This description constitutes Step A in NHST's workflow and whose explicit inclusion in any system is the critical starting point for a re-imagining and streamlining of this flow. In particular, it ultimately allows a progressive de-emphasising of Step B and Step C.

R & SAS—NHST Workflow

Figure 6:
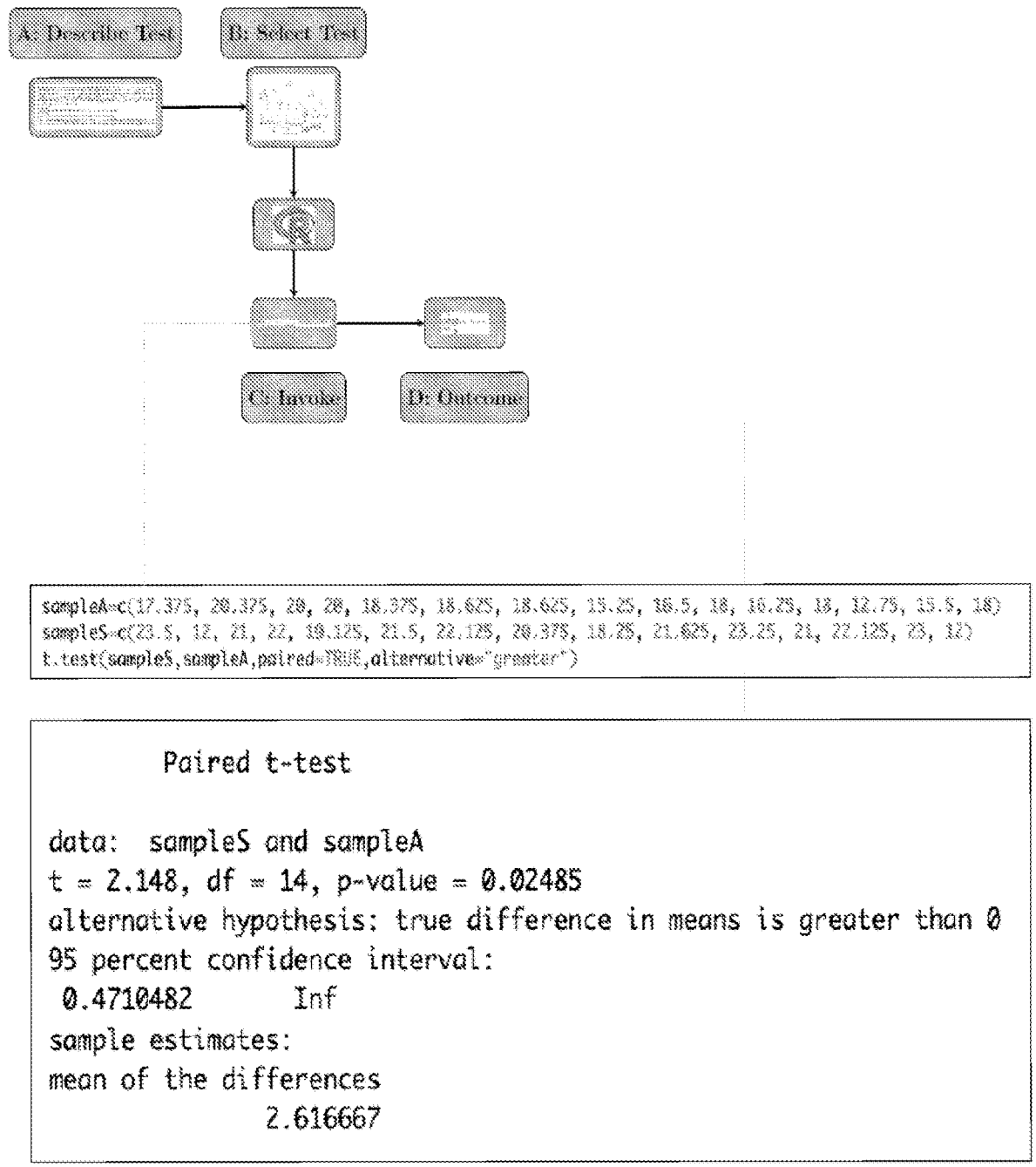
FIG. 6 illustrates a template for the NHST workflow in the R language and associated printout.

FIG. 6 illustrates an example NHST workflow in R. R studiously avoids Step B leaving it up to the invoker to provide a methodological rationale. R has an extensive user-base and package availability although without the usability and ease of use as being initiated in the embodiment.

Figure 7:
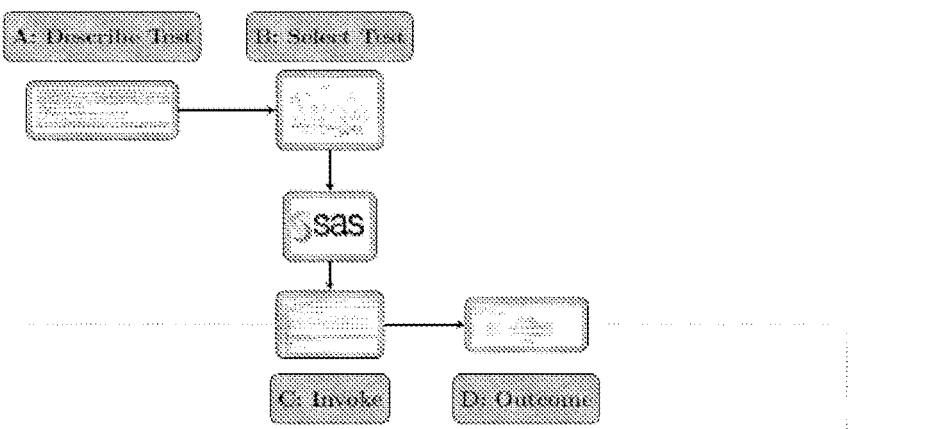
FIG. 7 illustrates an alternative NHST workflow implementation in SAS.

FIG. 7 illustrates the NHST workflow for SAS. A Command-line using legacy (1972) programming language (menus available) with extensive output but unfocused (p-value of 0.0248 expressed as Pr t).

Second Embodiment—Implementation

The second embodiment is designed to provide intuitive usability together with sound analytical interpretations.

Figure 8:
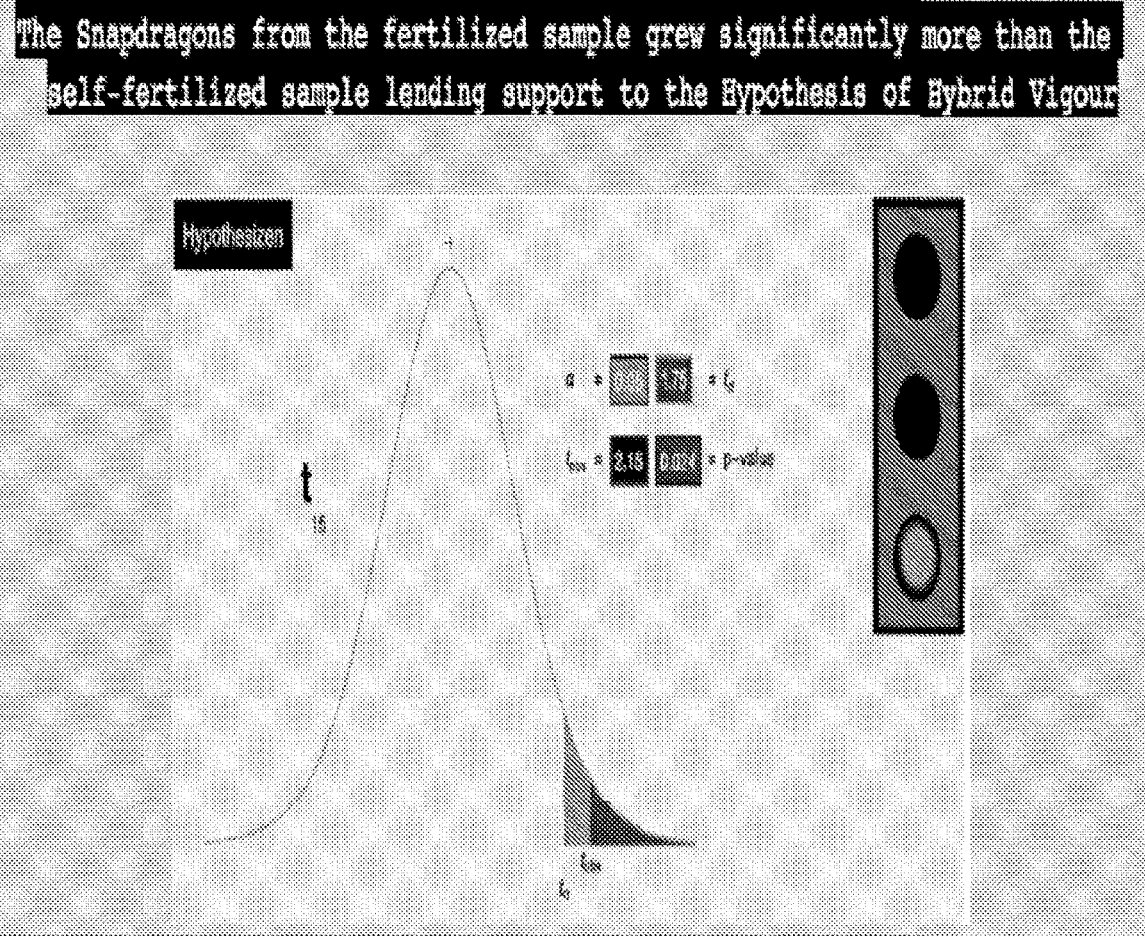
FIG. 8 illustrates a further alternative NHST workflow including automation of a number of the steps.
Figure 9:
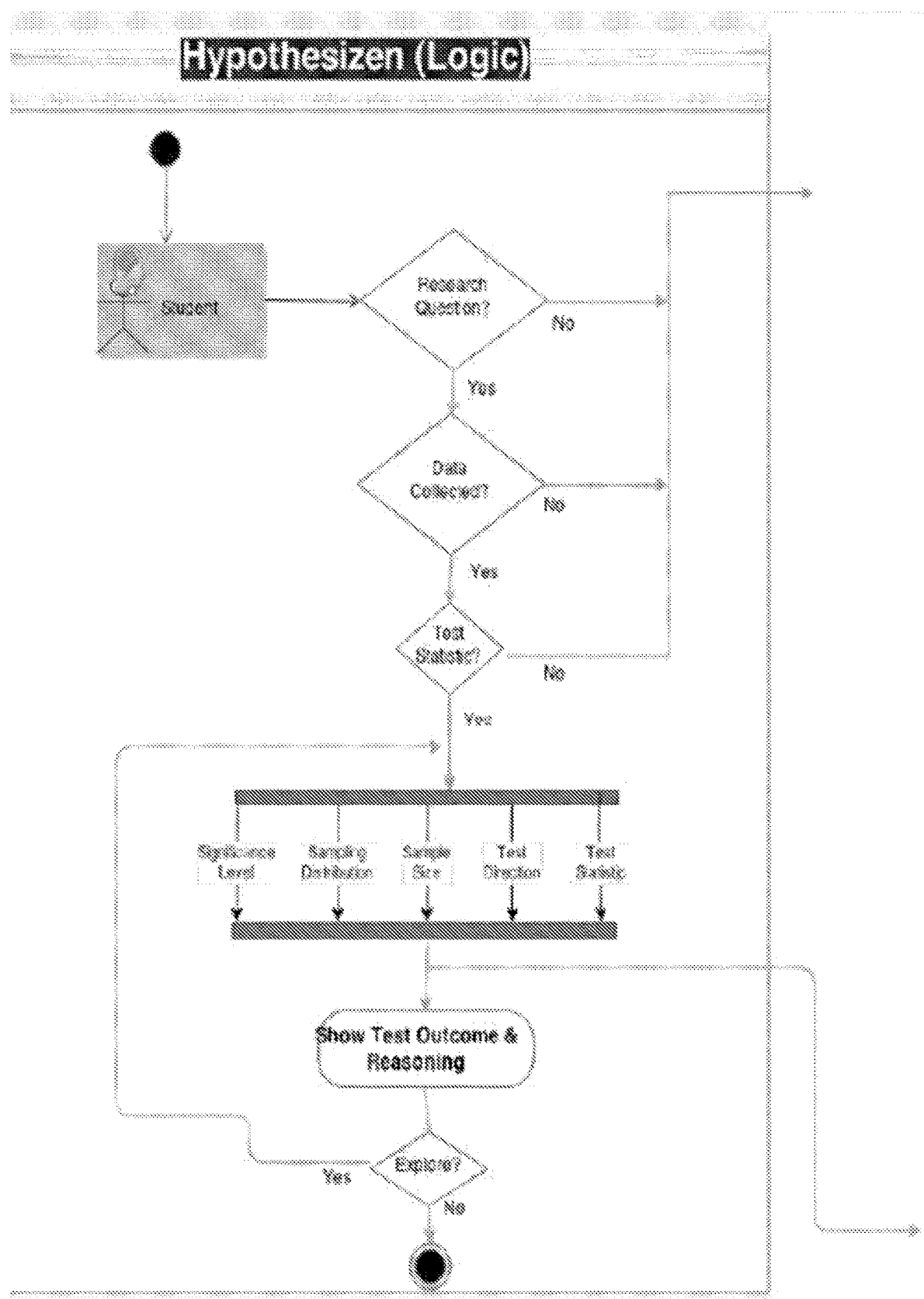
FIG. 9 illustrates a first flow chart of an implementation of the 4 step NHST workflow.
Figure 10:
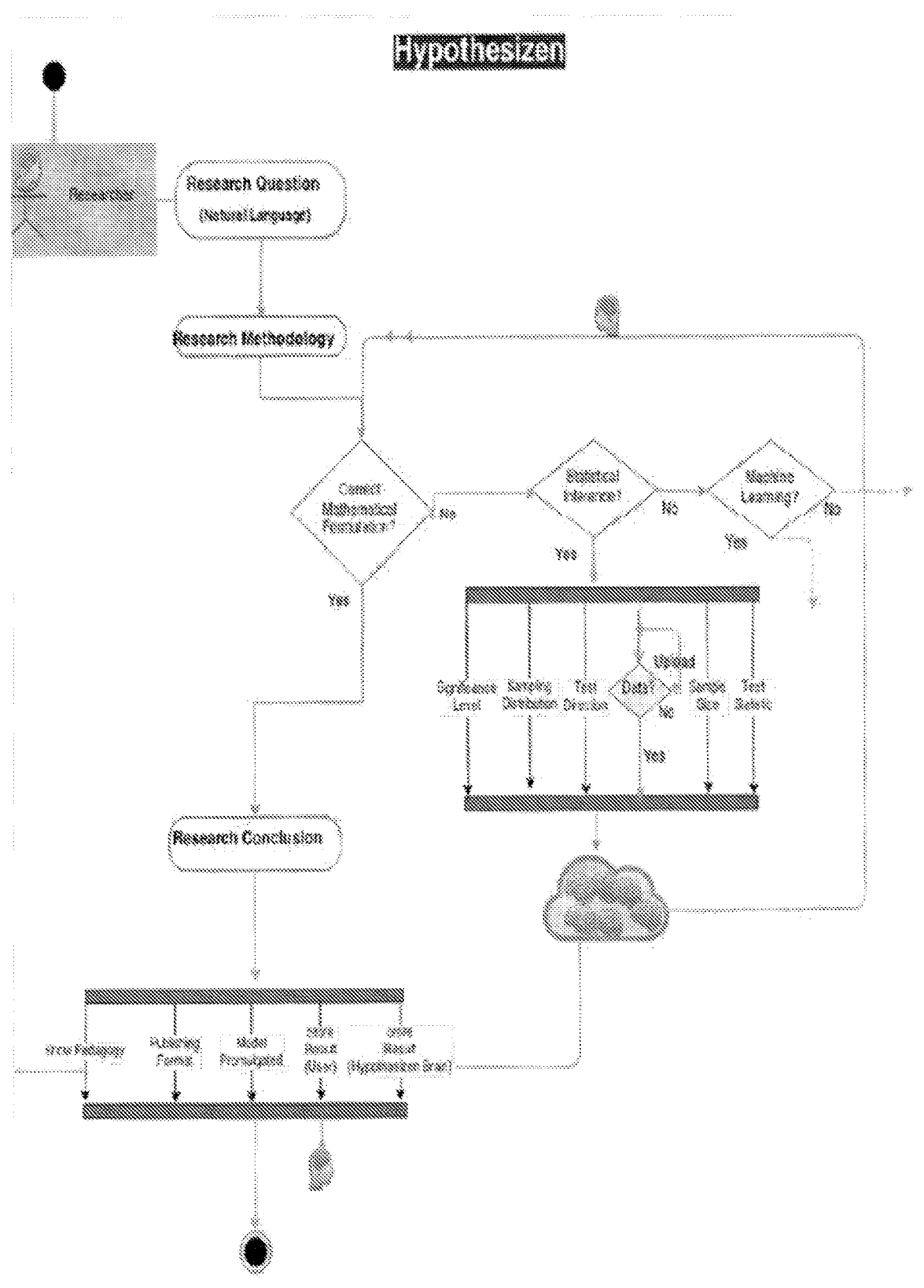
FIG. 10 illustrates a second flow chart of an implementation of the automated 2 step NHST workflow.

The embodiment-logic unifies the logic of tests of statistical inference into a single, unified interface. The embodiment seeks to unify the practice of performing statistical inference (later scientific inference) by integrating natural language and "computational intelligence" into analyses' computation. In its workflow a test starts with a linguistic, experimental description and ends with a linguistic, experimental outcome. The intermediate computations are selected and performed by machine-learning acting on similar descriptions and/or (where needed) user-interaction with the tester's favorite statistical system. FIG. 8 illustrates the output format of this embodiment.

The second embodiment seeks to automate the selection (Step B) and invocation (Step C) in NHST's workflow. This allows for the ability to carefully describe an experiment and its observed data and to simultaneously receive the experimental outcome.

The checking of experimental assumptions is performed automatically (or with extra user-interactions if necessary) based on the language used and a large corpus of previous examples (for example, numbered in the hundreds of thousands). Further, a variety of other possible analyses with other methodologies is immediately suggested leading to deeper and richer interpretations of the collected data. The second embodiment's ability to translate a user's natural language description of their hypothesis into a correct mathematical formulation rests on applying Machine Learning (ML) models previously trained on thousands of similar natural language descriptions already correctly translated.

A key plank to realizing this blueprint therefore, includes compiling a corpus of natural language descriptions of Hypotheses together with their correct, corresponding mathematical formulations.

There are a number of possible approaches to this large-scale compilation; by hand, via textbooks and journal articles or alternatively, more organically through having the global community perform such translations themselves from a dedicated portal.

One approach to corpus compilation involves scouring the educational and research literature for Hypothesis descriptions before attaching corresponding mathematical formulations "by-hand". Such an approach however is not massively scalable. The second embodiment's ultimate success therefore, depends on being able to sufficiently incentivize users to engage with its portal and in so doing provide these corresponding mathematical formulations. The overriding incentive for such engagement can be the ubiquitous difficulties students and researchers daily face in intuitively and efficiently performing hypotheses testing.

These currently include:

1. Students wanting to graduate from courses carrying out Hypothesis Testing

2. Researchers wanting to drastically improve the efficiently with which they perform standard statistical tests in their experiments.

3. Students needing to conceptualize the unifying logic behind all tests by applying the embodiment (Logic) pedagogical plug-in.

4. Researchers needing to quickly confirm the outcome of an experiment by using the embodiment (Logic)'s visualization.

5. Students needing to collate all their statistical tests in the cloud for either exam preparation or preparing career portfolios.

6. Researchers needing to store all their statistical tests in the cloud as part of managing their research career.

7. Researchers wanting efficiency and verification dividends from streamlining their publishing workflows by integrating the embodiment with other cloud services (e.g. publishers like Overleaf, reference management systems such as Mendelay or data storage portals such as Wolfram Research's data drops.)

8. Students/Researchers wanting a bridge/translation device to the programming language of popular statistical systems.

9. Students and Researchers needing to transition from statistical inference to other, more powerful scientific methodologies but within a familiar framework.

10. Students/Researchers wanting to make connections with collaborators/consulting services during their education/research workflows.

With these incentives in place, the second embodiment is able to collect and collate descriptions and mathematical formulations within a single database. New machine learning models can then be continuously refined to progressively improve the second embodiment's interpretation of a user's experimental intent.

An important part of this progressive improvement includes gracefully dealing with the situation in which a ML model misclassifies an intended Hypothesis test. Inevitably, no model will ever be perfect and users ongoing refinement of its generated suggestions therefore forms an integral part of the second embodiment's improvement. It is to be noted however that an important feature includes users retaining the right to override the second embodiment's automatic setting if required.

Finally, a mechanism is needed for estimating the probability of a user's correct mathematical formulation based on the experiment's natural language description. Users have considerable incentives for getting this interpretation right (ensuring their research findings are rigorous and/or students graduate with high grades) but nonetheless a quality control filter is needed to ensure high levels of correctness and integrity.

The quality control assessing the correctness of inputted mathematical formulations is to be performed by again applying ML as part of evaluating users' submissions (interpretations can be, for example, weighted differently according to whether they come from experienced researchers or neophytes).

This embodiment therefore includes the core steps:

1. Allowing users to input natural language descriptions into a dedicated hypothesis testing portal that organizes and interacts with users in finding correct interpretations of their Hypothesis tests.

2. Applying machine learning techniques in harnessing previous user interactions as part of improving the portal's intelligence.

3. Displaying the interactive results of step 2 for user review and interaction.

It is through both steps that a program of progressive improvement is instituted.

Hypothesizen is ultimately able to more intuitively perform NHST tests because of the methodology's extended pedigree—over a century a linguistic and phrasal vocabulary has been built up for describing its application. By mining this corpus (predominantly user-entered but without excluding literature-processed) Hypothesizen is able to predict from the user's natural language what experimental design (and therefore corresponding mathematical formulation) they have in mind.

Since this embodiment of Hypothesizen employs natural language to invoke NHST tests, instead of the traditional menu/code formulations, it's methodology becomes accessible to a wider, potentially even lay audience.

In one embodiment of the invention, an inference model is trained on a training set consisting of a corpus of natural language descriptions (that encompass assumptions, hypothesis parameters and experimental data) with each description paired with the Hypothesis Test that is "appropriate" for testing statistical significance. With sufficient training (from corpuses curated but also from user-input to the invention) the model so formed is then able to infer the appropriate test when provided with an unseen (natural language) description of a new testing scenario.

This is an example of supervised machine learning an instantiation of which can be observed with the following schema referencing its implementation in the Wolfram Language.

```
Classify[{
    desc_1->class_1,
    desc_2->class_2,
    ...
    desc_N->class_N, Method->MLMethod]
```

Here the desc_i represent all the different linguistic descriptions in the corpus, the class_i represent the corresponding, appropriate statistical test (e.g. z-test, t-test, paired-test, F-test etc) while the MLMethod represent one of the standard tests used in machine learning ("Logistic Regression", "Markov", "Naive Bayes", "Nearest Neighbors", "Neural Network", "Random Forest", "Support Vector Machine").

In the case where the corresponding output is not discrete but involves possible distributions to describe reasonable test selections, the Wolfram Language instantiation becomes:

```
Predict[{
    desc_1->out_1,
    desc_2->out_2,
    ...
    desc_N->out_N, Method->MLMethod]
    now with possible MLMethods
    ("Linear Regression", "Nearest Neighbors", "Neural Network",
    "Random Forest", "Gaussian Process").
```

(From *Mathematica* Version 10 (Documentation & Guides) Wolfram Research, Inc., Champaign, Illinois, 2014)

Interpretation

In the specification phrases similar to "inferentially select the appropriate type of hypothesis test" describes specifically, the invention's operation in automatically selecting the appropriate test. It doesn't infer, for example, that such selection be confined to the methods of statistical inference. Further, when such selection uses standard techniques from machine learning, those skilled in the art, would recognize such inference as "prediction" or an act of "predictive analytics" even though this selection can apply to events in the past.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. Thus, while there has been described what are believed to be the embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. An automatic method for the performance of scientific inferencing on a computational system, comprising:
   receiving a natural language input description of a hypothesis test relating to an experiment and data-on which the hypothesis is to be tested, which comprises the hypothesis test's design, the hypothesis test's experimental conditions and measurements obtained from the experiment;
   inferring a mathematical formulation of the-hypothesis-test from the input description for conducting the hypothesis test using the computational system, wherein the inferring of the mathematical formulation comprises-automatically inductively selecting an appropriate type of test, where uncertainty is tolerated and quantified by a machine learning algorithm that generates a plurality of plausible candidate statistical tests for selection of the appropriate test therefrom, each with different likelihoods of applicability of the respective statistical test;

executing the hypothesis test on the measurements using the corresponding inferred mathematical formulation and the input description with the computation system;

displaying-the results of the hypothesis test with the highest likelihood;

receiving in the computational system, an acceptability input reflective of the user's acceptance or rejection or modification of the inductively selected appropriate type of test;

saving the results of at least one the plurality of statistical tests and the acceptability input; and further training the machine learning engine using the saved results and acceptability input.

2. A method according to claim 1, wherein the natural language input description of the hypothesis test, and data on which the hypothesis is being tested is in the form of a single entry text based natural language description.

3. A method according to claim 1, further comprises inductively inferring the mathematical formulation from a corpus of hypothesis test cases.

4. A method according to claim 3, wherein the inferring the mathematical formulation from a corpus of hypothesis test cases comprises inductively inferring the type of test for the mathematical formulation from natural language input descriptions and executed hypothesis tests in the corpus of hypothesis test cases.

5. A method according to claim 3, wherein further training of the machine learning engine comprises training a processor to inductively inferentially select the appropriate type of test from the corpus of hypothesis test cases.

6. A method according to claim 3, wherein the saved results are of added to the corpus of hypothesis test cases.

7. A method according to claim 1, wherein the display includes the inferred mathematical formulation for verification by the user, wherein the inductively inferential selection of the type of test is changed when the acceptability input indicates that the displayed inferred mathematical formulation is rejected.

8. A method according to claim 7, wherein the change of the inferential selection of the type of test is automatic upon receiving the user input.

9. A method according to claim 7, where in the display includes at least one assumption of the hypothesis test inferred from the input description.

10. A method according to claim 9, further comprising receiving natural language input from the user to change the at least one assumption of the hypothesis test.

11. A method according to claim 10, wherein the inferential selection of the type of test is automatically changed when the input changes the at least one assumption.

12. A method according to claim 7, further comprises re-execution of the hypothesis test after a change is made.

13. A method according to claim 12, further comprises adding the results of the re-execution of the changed type of test to the corpus of hypothesis test cases.

14. A method according to claim 1, further comprises receiving an input from the user to change a parameter of the mathematical formulation.

15. A method according to claim 1, wherein one of the parameters of the mathematical formulation is the probability value or the significance level of the hypothesis test.

16. A method according to claim 1, further comprising display of a plurality of individual parameters of the input description.

17. A method according to claim 1, wherein the computational system retrieves a set of information from an external source relevant to a null hypothesis test.

18. A method according to claim 17, where the set of information from the external source supports the inference of the mathematical formulation.

19. A method for inferring a mathematical formulation of a hypothesis test relating to an experiment on a computational system, comprising:

inductively inferring a corresponding mathematical formulation from a natural language input description from a user, where uncertainty is tolerated and quantified by a machine learning algorithm that generates a plurality of plausible candidate statistical tests for selection of the appropriate test therefrom, each with different likelihoods of applicability of the respective statistical test;

inductively inferring a set of corresponding assumptions for application to the corresponding mathematical formulation from the natural language input description from the user, where uncertainty is tolerated; and displaying the corresponding mathematical formulation and the set of corresponding assumptions for verification by the user;

receiving in the computational system, an acceptability input reflective of the user's acceptance or rejection or modification of the mathematical formulation or the assumptions;

saving the results of at least one the plurality of statistical tests and the acceptability Input; and further training the machine learning engine using the saved results and acceptability input;

wherein the natural language input comprises the hypothesis test's design, the hypothesis test's experimental conditions and measurements obtained from the experiment.

20. A system for performing scientific inferencing on a computational system, comprising:

a receiver for receiving a natural language input description from a user of a hypothesis relating to an experiment and data on which the hypothesis is to be tested, which comprises the hypothesis test's design, the hypothesis test's experimental conditions and measurements obtained from the experiment;

a processor for inferring a mathematical formulation of the hypothesis test from the input description for conducting the hypothesis test using the computational system, wherein the inferring of the mathematical formulation comprises automatically inductively selecting an appropriate type of test, where uncertainty is tolerated and quantified by a machine learning algorithm that generates a plurality of plausible candidate statistical tests for selection of the appropriate test therefrom, each with different likelihoods of applicability of the respective statistical test;

a processor for executing the hypothesis test on the measurements using the corresponding inferred mathematical formulation and the input description with the computation system;

an output to a display for displaying the results of the hypothesis test;

an input device for receiving an acceptability input reflective of the user's acceptance or rejection or modification of the inductively selected appropriate type of test;
a storage for saving the results of at least one the plurality of statistical tests and the acceptability input; and
a trainer for further training the machine learning engine using the saved results and acceptability input.

* * * * *